United States Patent
Yamamoto et al.

(10) Patent No.: US 10,214,168 B1
(45) Date of Patent: Feb. 26, 2019

(54) SLIDE WIRING DEVICE

(71) Applicants: AUTONETWORKS TECHNOLOGIES, LTD., Yokkaichi-shi, Mie (JP); SUMITOMO WIRING SYSTEMS, LTD., Yokkaichi-shi, Mie (JP); SUMITOMO ELECTRIC INDUSTRIES, LTD., Osaka-shi, Osaka (JP)

(72) Inventors: Satoshi Yamamoto, Yokkaichi (JP); Sakata Tomoyuki, Yokkaichi (JP); Makoto Higashikozono, Yokkaichi (JP)

(73) Assignees: AUTONETWORKS TECHNOLOGIES, LTD., Yokkaichi-shi, Mie (JP); SUMITOMO WIRING SYSTEMS, LTD., Yokkaichi-shi, Mie (JP); SUMITOMO ELECTRIC INDUSTRIES, LTD., Osaka-shi, Osaka (JP)

(*) Notice: Subject to any disclaimer, the term of this patent is extended or adjusted under 35 U.S.C. 154(b) by 0 days.

(21) Appl. No.: 15/759,140

(22) PCT Filed: Sep. 13, 2016

(86) PCT No.: PCT/JP2016/076896
§ 371 (c)(1),
(2) Date: Mar. 9, 2018

(87) PCT Pub. No.: WO2017/056954
PCT Pub. Date: Apr. 6, 2017

(30) Foreign Application Priority Data

Oct. 1, 2015 (JP) .................................. 2015-195704

(51) Int. Cl.
*B60R 22/34* (2006.01)
*B60R 16/027* (2006.01)
(Continued)

(52) U.S. Cl.
CPC .............. *B60R 16/027* (2013.01); *B60N 2/06* (2013.01); *B60N 2/90* (2018.02); *B60R 16/0215* (2013.01);
(Continued)

(58) Field of Classification Search
CPC combination set(s) only.
See application file for complete search history.

(56) References Cited

U.S. PATENT DOCUMENTS 4,447,934 A * 5/1984 Anscher .................. F16L 3/233
24/16 PB
4,804,226 A * 2/1989 Schmale ................ B60N 2/688
297/216.13

(Continued)

FOREIGN PATENT DOCUMENTS

JP 2014015108 A 1/2014
JP 2014187737 A 10/2014

OTHER PUBLICATIONS

International Search Report for Application No. PCT/JP2016/076896 dated Nov. 1, 2016; 4 pages.

*Primary Examiner* — William H. Mayo, III
*Assistant Examiner* — Krystal Robinson
(74) *Attorney, Agent, or Firm* — Reising Ethington, P.C.

(57) ABSTRACT

A slide wiring device includes: a metal rail; a slider slidably arranged on the metal rail; a wire harness in which a plurality of electric wires are armored by an armoring member made of a resin, the wire harness being coupled to the slider and configured to move in the metal rail along with movement of the slider; and a resin rail that is arranged inside the metal rail, and is configured to confine movement of the armoring member. The armoring member is configured to move on the resin rail along with the movement of the slider.

4 Claims, 17 Drawing Sheets

(51) Int. Cl.
*B60N 2/90* (2018.01)
*B60R 16/02* (2006.01)
*B60N 2/06* (2006.01)
*H02G 11/00* (2006.01)
*B60R 22/26* (2006.01)
*H02G 3/04* (2006.01)

(52) U.S. Cl.
CPC .............. *B60R 22/26* (2013.01); *B60R 22/34* (2013.01); *H02G 11/006* (2013.01); *H02G 3/0468* (2013.01)

(56) References Cited

U.S. PATENT DOCUMENTS

| | | | | |
|---|---|---|---|---|
| 5,292,178 | A * | 3/1994 | Loose | B60N 2/0232 297/337 |
| 5,967,604 | A * | 10/1999 | Yoshida | B60N 2/4221 248/429 |
| 7,042,738 | B2 * | 5/2006 | Tsubaki | B60R 16/0215 174/72 A |
| 7,053,306 | B2 * | 5/2006 | Tsubaki | B60R 16/0215 174/72 A |
| 7,238,029 | B2 * | 7/2007 | Tsubaki | B60R 16/0215 174/72 A |
| 7,284,785 | B2 * | 10/2007 | Gotou | H02G 3/0475 174/72 A |
| 7,402,044 | B2 * | 7/2008 | Terada | B60N 2/06 174/72 A |
| 2003/0119338 | A1 * | 6/2003 | Bigotto | B60R 16/027 439/34 |
| 2005/0035622 | A1 * | 2/2005 | Tsubaki | B60N 2/0224 296/65.13 |
| 2014/0374563 | A1 * | 12/2014 | Tuji | B60N 2/067 248/429 |
| 2018/0278036 | A1 * | 9/2018 | Kuboki | B60R 16/0215 |

* cited by examiner

SLIDE WIRING DEVICE

CROSS REFERENCE TO RELATED APPLICATIONS

This application claims the priority of Japanese patent application JP2015-195704 filed on Oct. 1, 2015, the entire contents of which are incorporated herein.

TECHNICAL FIELD

The present description provides a technique relating to a slide wiring device.

BACKGROUND ART

Conventionally, a slide wiring device disclosed in Patent Document 1 (JP2013-42658A) is known as a slide wiring device that electrically connects a vehicle and a sliding part such as a sliding seat installed in the vehicle. This slide wiring device is provided with: a rail; a slider slidably attached to the rail; and a wire harness that is arranged in the rail and has one end portion coupled to the slider. The wire harness is obtained by accommodating a plurality of electric wires in a corrugated tube.

SUMMARY

According to the above-described configuration, when, for example, the slider moves back and forth, also the wire harness coupled to the slider moves along with the slider in the rail. As described above, a plurality of electric wires are accommodated in a corrugated tube of the wire harness. Accordingly, in order for the wire harness to smoothly move in the rail, the outer surface of the corrugated tube needs to come into sliding contact with the rail, and the movement of the wire harness needs to be confined. In such a case, there is some concern that the corrugated tube may suffer wear due to its outer surface being in sliding contact with the rail. Wear of the corrugated tube is particularly problematic if the rail is made of metal.

As a hypothetical technique for solving the above-described problem, it is conceivable to use a rail made of a resin (plastic). However, the sliding part such as a sliding seat is relatively heavy, and thus there is the risk that a resin rail lacks strength.

The present design was made in view of the above-described circumstances, and it is an object thereof to provide a slide wiring device in which the damage of an armoring member is suppressed.

According to the technique disclosed in the present description, a slide wiring device includes: a metal rail; a slider slidably arranged on the metal rail; a wire harness in which a plurality of electric wires are armored by an armoring member made of a resin, the wire harness being coupled to the slider and configured to move in the metal rail along with movement of the slider; and a resin rail that is arranged inside the metal rail, and is configured to confine movement of the armoring member, wherein the armoring member is configured to move on the resin rail along with the movement of the slider.

According to the technique disclosed in the present description, the armoring member moves on the resin rail, and thus does not need to come into sliding contact with (be confined by) the metal rail. Accordingly, even if the metal rail is used, it is possible to confine the movement of the wire harness while suppressing the damage of the armoring member.

The following aspects are preferable as embodiments of the present design.

Preferably, the armoring member includes an engaging portion that protrudes to the resin rail side, the resin rail includes an engaged portion that engages with the engaging portion, the engaged portion is a groove portion into which the engaging portion is inserted, and the groove portion includes, at its end portion, an entry-facilitating portion that widens toward the end portion, in a longitudinal direction, of the groove portion, and that is configured to facilitate entry of the engaging portion into the groove portion.

According to the above-described aspect, the engaging portion is configured to be reliably facilitated to enter the groove portion by the entry-facilitating portion. Accordingly, when the engaging portion is inserted into the groove portion, the collision of the armoring member with the resin rail is suppressed, thus making it possible to further suppress the damage of the armoring member.

The groove portion may have a bottom wall, and side walls that rise up from side edges of the bottom wall, each side wall may have a through hole penetrating the side wall at a position close to the bottom wall, and the through hole may have a bottom surface inclined downward toward the outside of the side wall.

According to the above-described aspect, even if a foreign object such as sand or gravel stone has entered the groove portion, the object is promptly discharged from the through hole to the outside of the groove portion. It is possible to suppress the armoring member from colliding with and being damaged by the foreign object that has entered the groove portion.

The metal rail may have, on its inner bottom surface, a fixing member for fixing the metal rail to a vehicle body, and the resin rail may include a pedestal that is arranged on the inner bottom surface and has a height greater than the height of the fixing member, the resin rail confining the movement of the armoring member above the pedestal.

According to the above-described aspects, it is possible to keep the armoring member from interfering with the fixing member. Accordingly, it is possible to reliably suppress the damage of the armoring member.

The present design was made in view of the above-described circumstances, and it is an object thereof to provide a slide wiring device in which the damage of an armoring member is suppressed.

DESCRIPTION OF EMBODIMENTS

Embodiment 1

Embodiment 1 of the present design will be described with reference to FIGS. 1 to 17. A slide wiring device 10 according to the present embodiment is used for a wire harness 13 to be arranged between a vehicle body 11 and a seat 12 of a vehicle such as an automobile (not shown). In the following, a description will be given assuming that the X direction of FIG. 1 refers to a "right" direction, the Y direction refers to a "front" direction, and the Z direction refers to an "up" direction.

Figure 1:
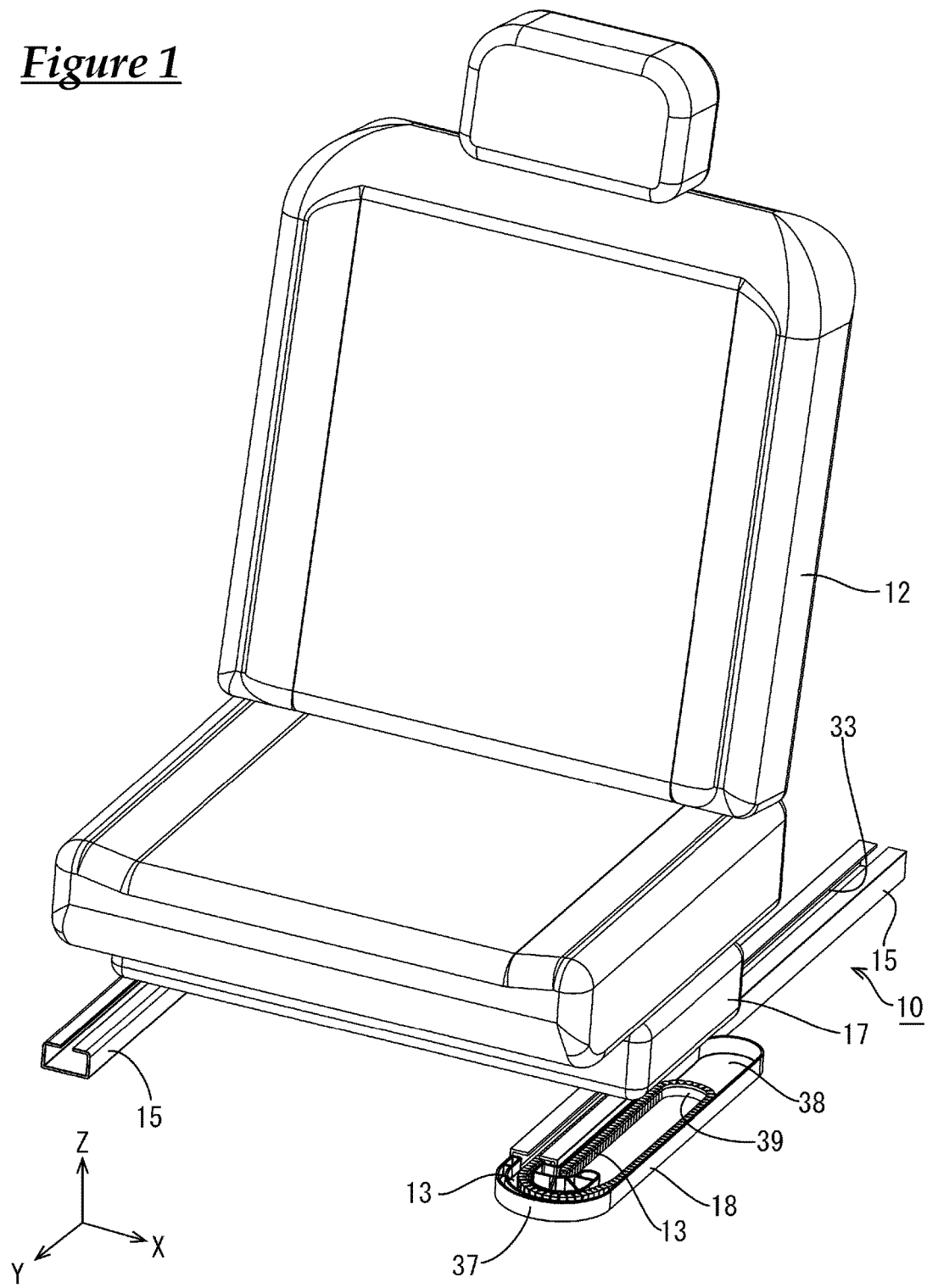
FIG. 1 is a perspective view illustrating a slide wiring device according to Embodiment 1.
Figure 2:
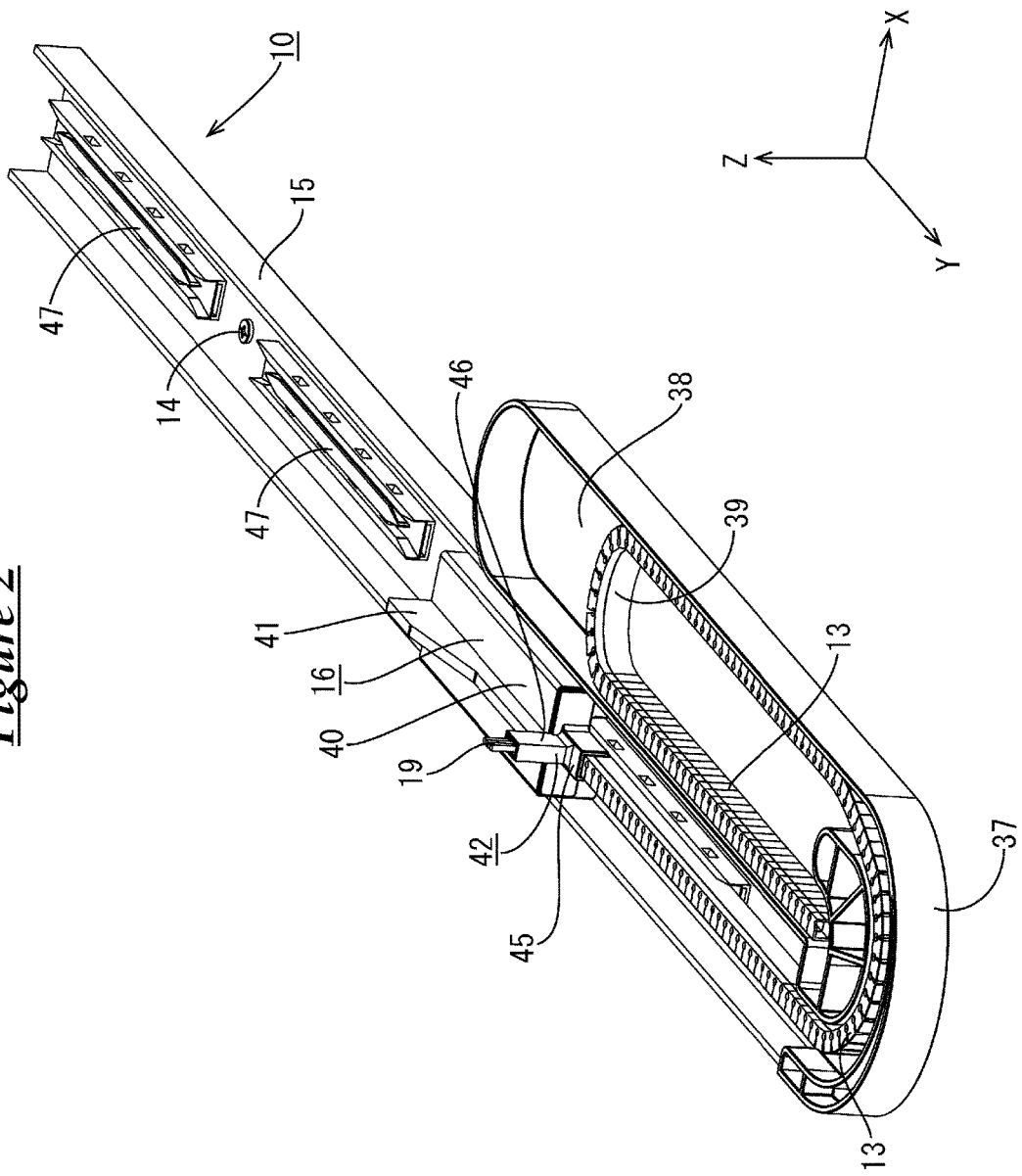
FIG. 2 is a perspective view illustrating the slide routing device without the upper wall of a metal rail.

As shown in FIG. 2, the seat 12 is slidable in the front-rear direction with respect to a metal rail 15 that is made of metal and is fixed to the vehicle body 11 with bolts 14 (an example of a fixing member). The seat 12 is provided with various types of electric components such as, for example, an electrically-driven reclining device, a seat heater, a sensor for detecting whether or not a passenger is seated, and a sensor for detecting whether or not a seat belt is worn. As shown in FIG. 1, a mounted part 17 that is mounted on sliders 16 slidably arranged on the metal rails 15 is provided below the seat 12.

The wire harness 13 is arranged (below a mat, a panel or the like) on the floor of the vehicle body 11, or below the floor, and is connected to equipment (not shown) such as an ECU (Electronic Control Unit) on the vehicle body 11 side. Power supply and signal transmission and reception between the equipment on the vehicle body 11 side and the electric components of the seat 12 are realized via the wire harness 13.

Figure 3:
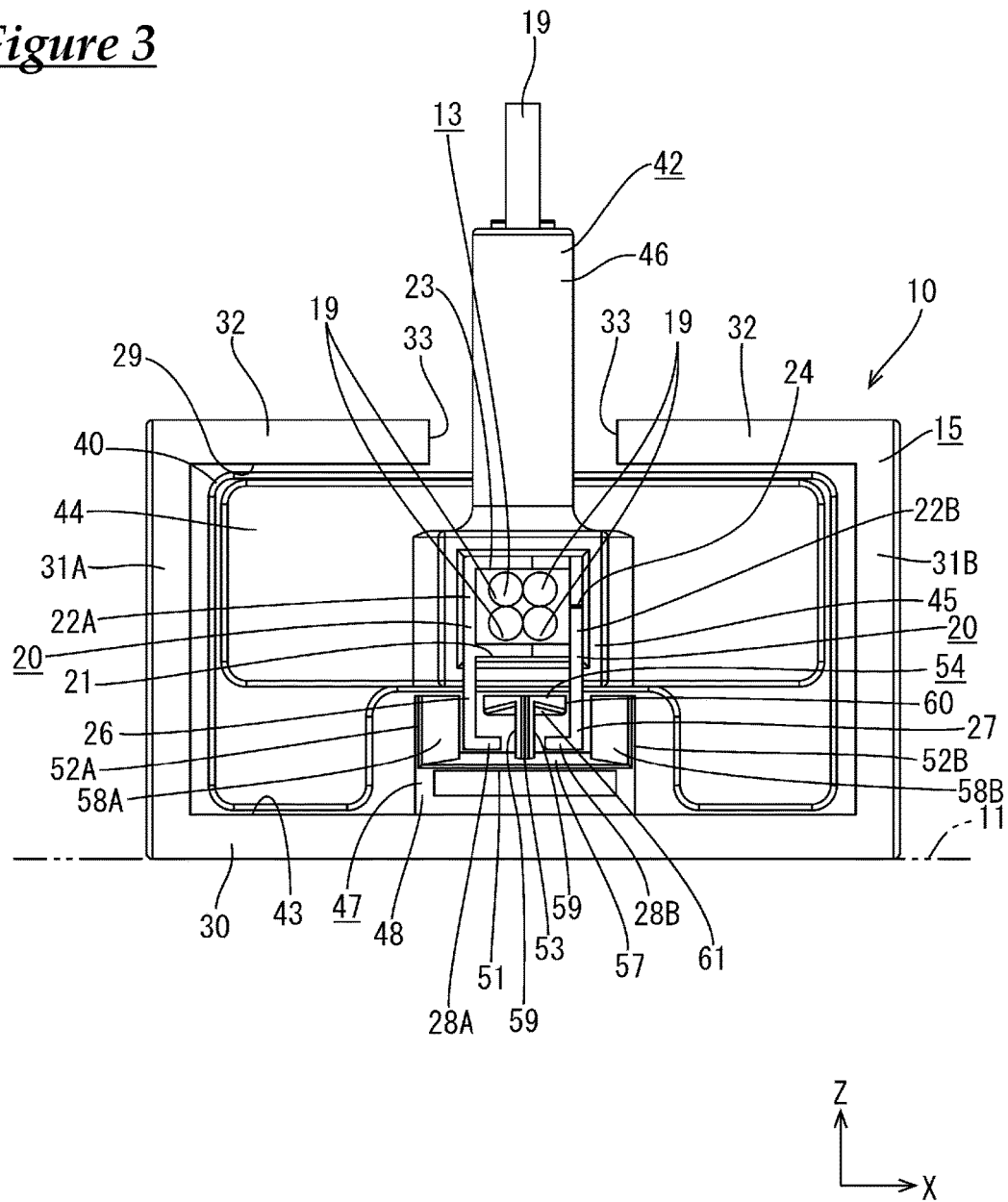
FIG. 3 is a front view illustrating the slide routing device.

As shown in FIG. 1, the wire harness 13 arranged between the seat 12 and the vehicle body 11 is inserted in the metal rail 15 disposed below the seat 12, and in an excess length absorbing member 18. As shown in FIGS. 2 and 3, the wire harness 13 is provided with: a plurality of (four, in the present embodiment) electric wires 19; and an armoring member 20 covering the plurality of electric wires 19. The electric wires 19 are coated electric wires whose conductor portion made of metal is coated with an insulating layer, and are connected to various types of electric components provided on the seat 12. Note that the wire harness 13 that is arranged outside the metal rail 15 and the excess length absorbing member 18 is arranged in a state in which the plurality of electric wires 19 are not covered with the armoring member 20.

Figure 4:
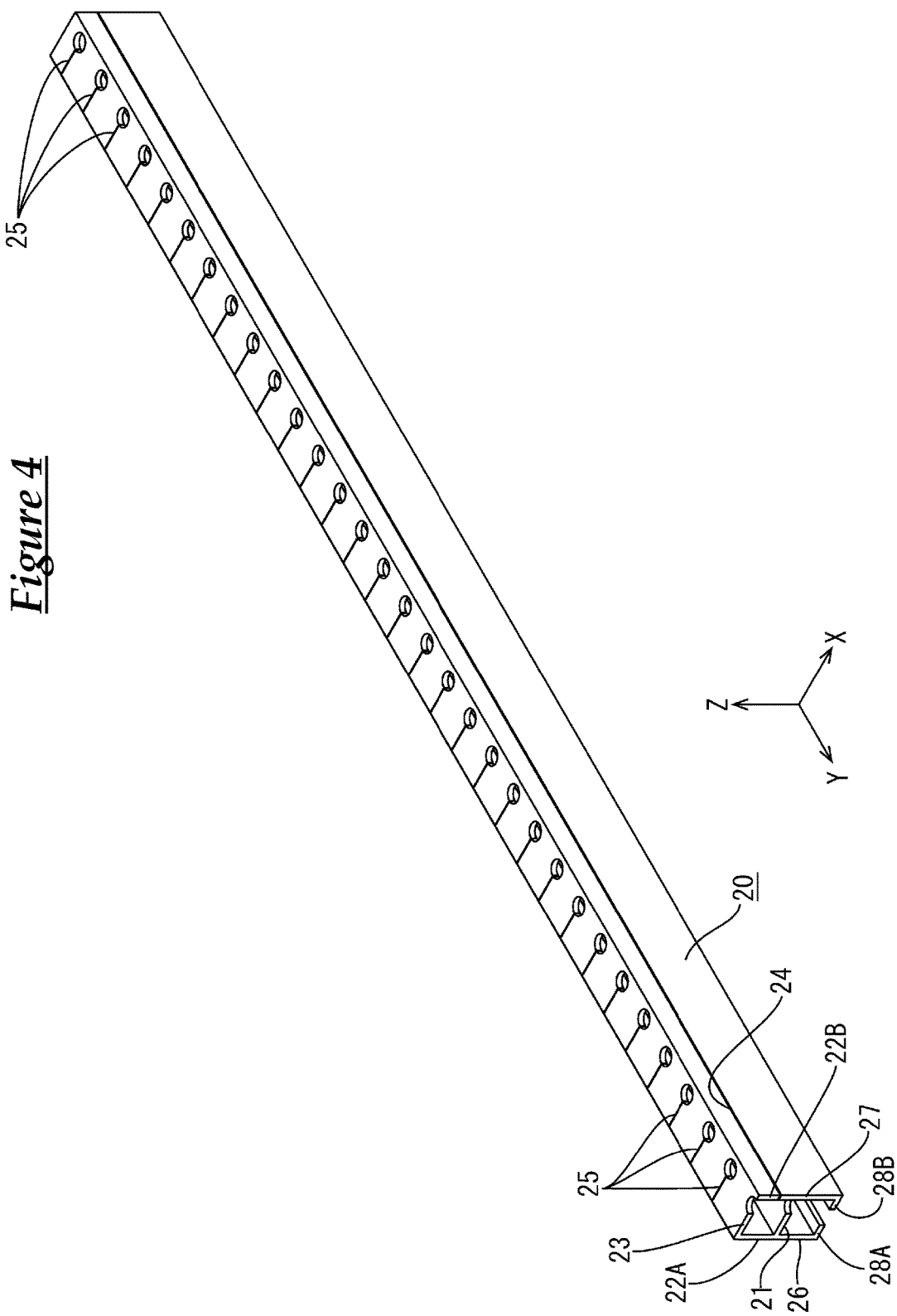
FIG. 4 is a perspective view illustrating an armoring member.
Figure 5:
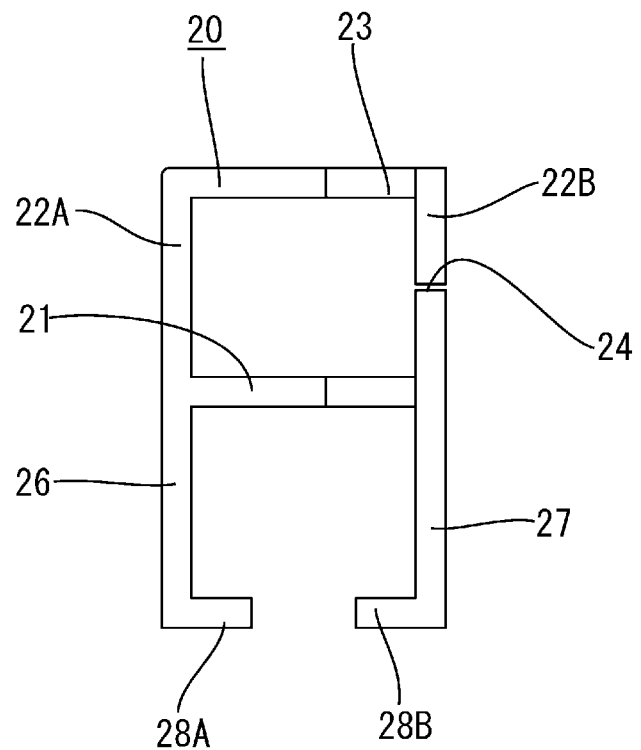
FIG. 5 is a front view illustrating the armoring member.

As shown in FIGS. 4 and 5, the armoring member 20 is made of an insulating synthetic resin and is tubular. The armoring member 20 has a bottom wall 21, a pair of side walls 22A and 22B that rise up from the side edges of the bottom wall 21, and an upper wall 23 that connects the upper ends of the pair of side walls 22A and 22B. The armoring member 20 accommodates, inside thereof, the plurality of electric wires 19, and thus the plurality of electric wires 19 are armored by the armoring member 20. The armoring member 20 according to the present embodiment is rectangularly tubular but may also be circularly tubular, and the cross-section of the armoring member 20 may have a multangular shape such as a triangular shape or a hexagonal shape.

The armoring member 20 has a slit 24 in the side wall 22B, which is located on the right side in FIG. 5, the slit 24 extending in the front-rear direction. The slit 24 is configured to allow the plurality of electric wires 19 to be accommodated in the armoring member 20 therefrom. The plurality of electric wires 19 may also be accommodated in the armoring member 20 by being inserted from one end of the armoring member 20 to the other end thereof.

Figure 6:
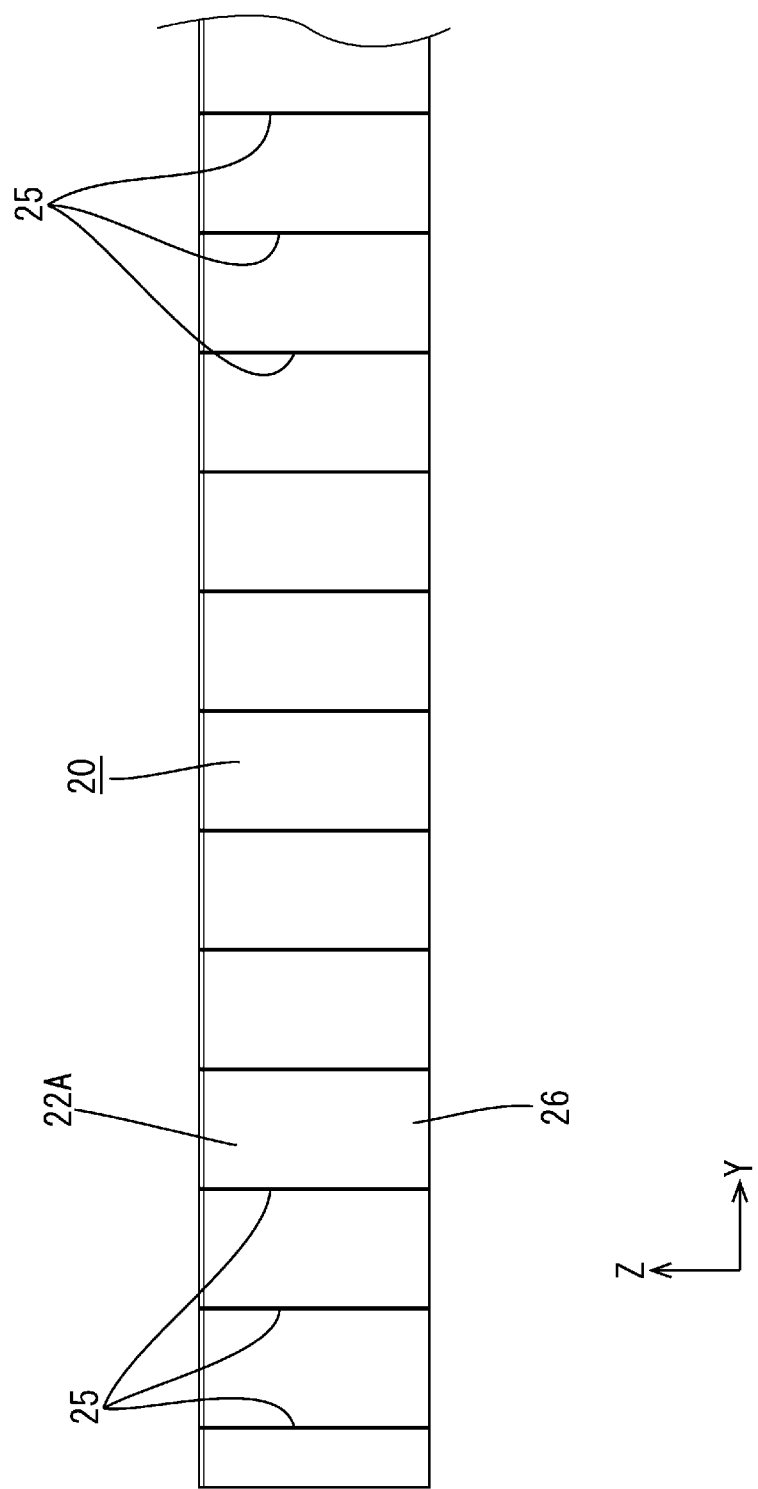
FIG. 6 is a side view illustrating the armoring member.
Figure 7:
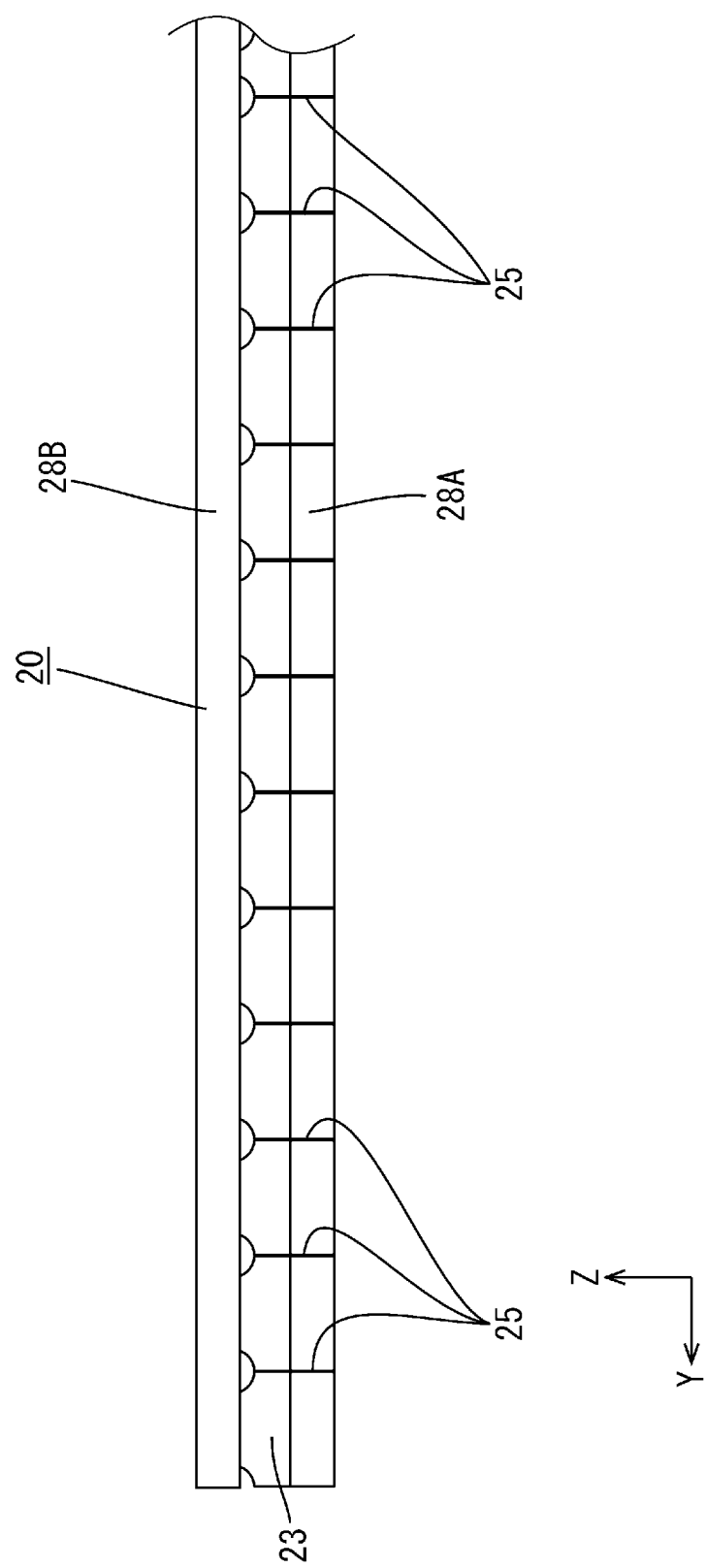
FIG. 7 is a bottom view illustrating the armoring member.

The armoring member 20 has a plurality of slits 25 that extend in the up-down direction, and are formed in its upper wall 23 and its side wall 22A, which is located on the left side in FIG. 5, and thus it is possible for the armoring member 20 to bend only to one side in the left-right direction (to the excess length absorbing member 18 side) (see FIG. 6).

As shown in FIG. 5, the bottom wall 21 of the armoring member 20 has a left engaging portion 26 (an example of an engaging portion) and a right engaging portion 27 (an example of the engaging portion) that protrude downward. The left engaging portion 26 extends downward from a position that is close to the left end of the bottom wall 21 and corresponds to the side wall 22A of the armoring member 20. Also, the right engaging portion 27 extends downward from a position that is close to the right end of the bottom wall 21 and corresponds to the side wall 22B of the armoring member 20. The lower end edge of the left engaging portion 26 and the lower end edge of the right engaging portion 27 are respectively provided with retaining portions 28A and 28B that extend inward in the left-right direction (see FIG. 7).

As shown in FIG. 1, the metal rails 15 are made of metal, and a pair of metal rail 15 are provided on the floor for each seat 12. Any metal such as stainless steel, aluminum, or an aluminum alloy may be suitably used, as appropriate, for the metal of which the metal rails 15 are made.

The metal rails 15 extend straight in the front-rear direction, and have, as shown in FIG. 3, an insertion hole 29 through which the slider 16 is inserted, and that extends in the front-rear direction. The insertion hole 29 is rectangular and elongated in the left-right direction conforming to the cross-sectional shape of the slider 16.

Each metal rail 15 has a bottom wall 30 extending in the front-rear direction, a pair of side walls 31A and 31B that rise up from the left and right edges of the bottom wall 30, and an upper wall 32 that extends inward in the left-right direction from the upper end edges of the side walls 31A and 31B. The upper wall 32 has, at a position above the insertion hole 29, a through groove 33 that is in communication with the outside. The through groove 33 is formed in the upper wall in the vicinity of the central position in the left-right direction.

The bottom wall 30 is fixed onto the floor of the passenger compartment of the vehicle body 11 with bolts 14. In other words, the bolts 14 for fixing the metal rail 15 to the vehicle body 11 are provided on an inner bottom surface 43 of the metal rail 15. The heads of the bolts 14 protrude into the insertion hole 29.

The slider 16 is arranged on the upper side of the bottom wall 30 so as to be slidable in the front-rear direction. Both end portions, in the left-right direction, of the lower side of the slider 16 are suspended downward. In other words, the central portion, in the left-right direction, of the lower side of the slider 16 is recessed upward. Accordingly, the slider 16 is kept from interfering with a resin rail 47, which will be described later. More specifically, the lower side of the slider 16 is recessed further upward than the height of the resin rail 47 protruding from the upper side of the bottom wall 30.

As shown in FIG. 2, the excess length absorbing member 18 is mounted at a position adjacent to the front and lateral side of the metal rail 15. The excess length absorbing member 18 includes a folded portion 37 folded in a U-shape, and an accommodating chamber 38. An excess length portion 39 of the wire harness 13 that is not accommodated in the metal rail 15 passes through the folded portion 37 and is accommodated in the accommodating chamber 38, along with the seat 12 sliding forward.

The slider 16 is made of a synthetic resin or metal for example, and is slidable in the insertion hole 29 of the metal rail 15, and includes, as shown in FIG. 2, a horizontally long inserted portion 40 that is rectangular parallelepiped shaped, and is fitted into the insertion hole 29, and a mounting part 41 that protrudes upward from the upper side of the inserted portion 40 in the shape of a plate.

The mounting part 41 is formed along the entire length of the slider 16, and is fixed to the mounted part 17 of the seat 12 with a not-shown bolt or the like, for example. The mounting part 41 slides in a cut formed in the mat on the floor or the like. As a result of the mounting part 41 being mounted on and fixed to the mounted part 17, the slider 16 slides in the metal rail 15 along with the seat 12 sliding.

A guide member 42 is made of an insulating synthetic resin, and includes, as shown in FIGS. 2 and 3, an upward extending portion 46 through which the plurality of electric wires 19 are inserted, and that extends upward, a forward extending portion 45 that is contiguous with the upward extending portion 46 and extends in the front-rear direction, and through which the plurality of electric wires 19 are inserted, and a bulge portion 44 that bulges to the left and right of the upward extending portion 46 and the forward extending portion 45. The upward extending portion 46 and the forward extending portion 45 are tubular, and the electric wires 19 are inserted therethrough. As a result of being inserted through the upward extending portion 46 and the forward extending portion 45, the electric wires 19 are guided so that their orientation is changed from the front-rear direction to the up-down direction. The electric wires 19 inserted from the opening at the front end portion of the forward extending portion 45 are led out upward from the opening of the upper end portion of the upward extending portion 46.

The bulge portion 44 is rectangular plate shaped, and has such a size that it overlaps the front surface of the slider 16. The front surface of the slider 16 and the rear surface of the guide member 42 are fixed to each other with an adhesive, for example. As a result of the bulge portion 44 being fixed to the slider 16, the wire harness 13 is coupled to the slider 16. Accordingly, the wire harness 13 moves inside the metal rail 15 following the movement of the slider 16.

As shown in FIG. 3, the resin rail 47 made of a synthetic resin is fixed to the bottom wall 30 of the metal rail 15. The resin rail 47 has a shape elongated in the front-rear direction. The resin rail 47 is fixed to the metal rail 15 by a well-known method such as glueing, bolting, or riveting.

As shown in FIG. 2, a plurality of (three, in the present embodiment) resin rails 47 are attached to a single metal rail 15 at intervals in the front-rear direction. A bolt 14 for attaching the metal rail 15 to the vehicle body 11 is arranged between resin rails 47 that are adjacent to each other in the front and rear direction.

As shown in FIG. 3, each resin rail 47 has a pedestal 48 placed on the bottom wall 30 of the metal rail 15. The height of the pedestal 48 from the bottom wall 30 of the metal rail 15 is set to be greater than the height of the head of the bolt 14 from the bottom wall 30 of the metal rail 15. The resin rail 47 confines the movement of the armoring member 20 on the upper side of the pedestal 48, or at positions located further upward than the pedestal 48.

Figure 8:
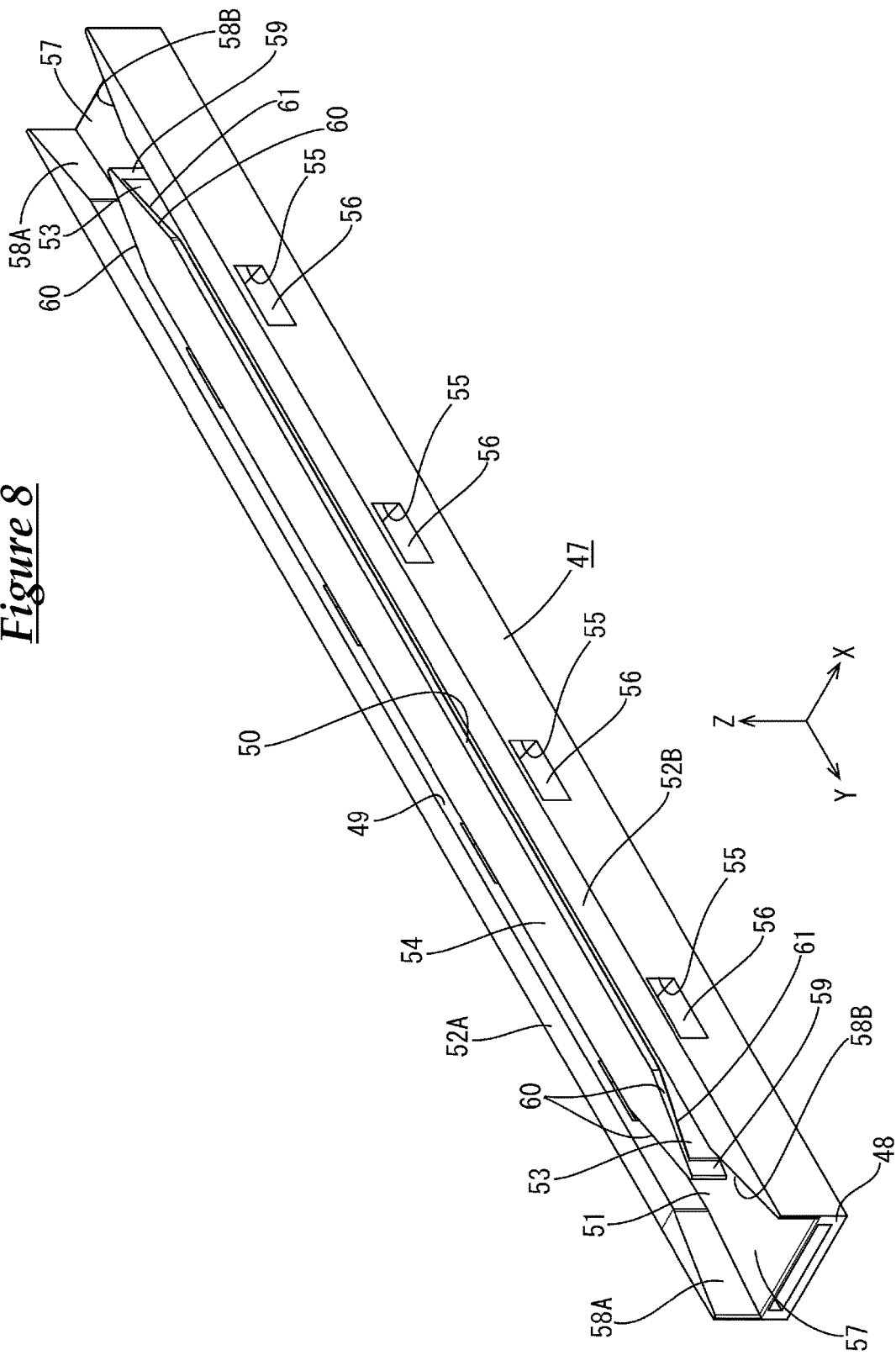
FIG. 8 is a perspective view illustrating a resin rail.
Figure 9:
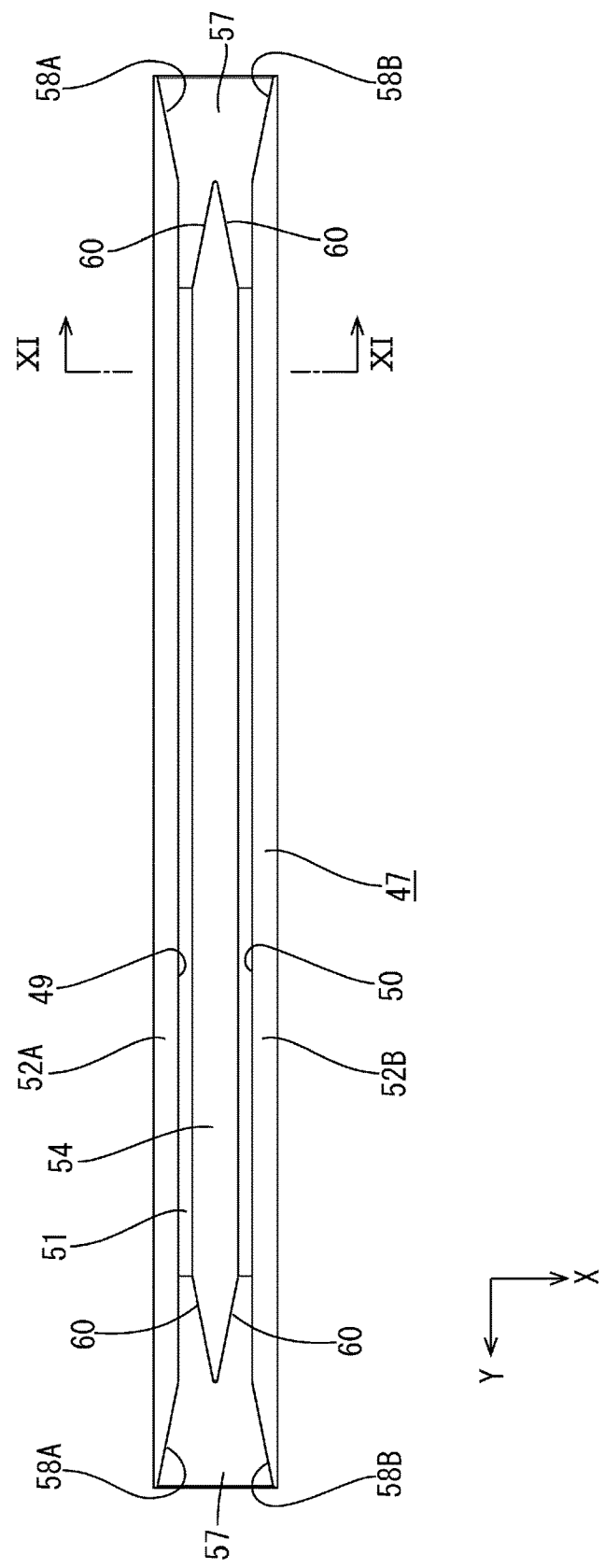
FIG. 9 is a plan view illustrating the resin rail.
Figure 12:
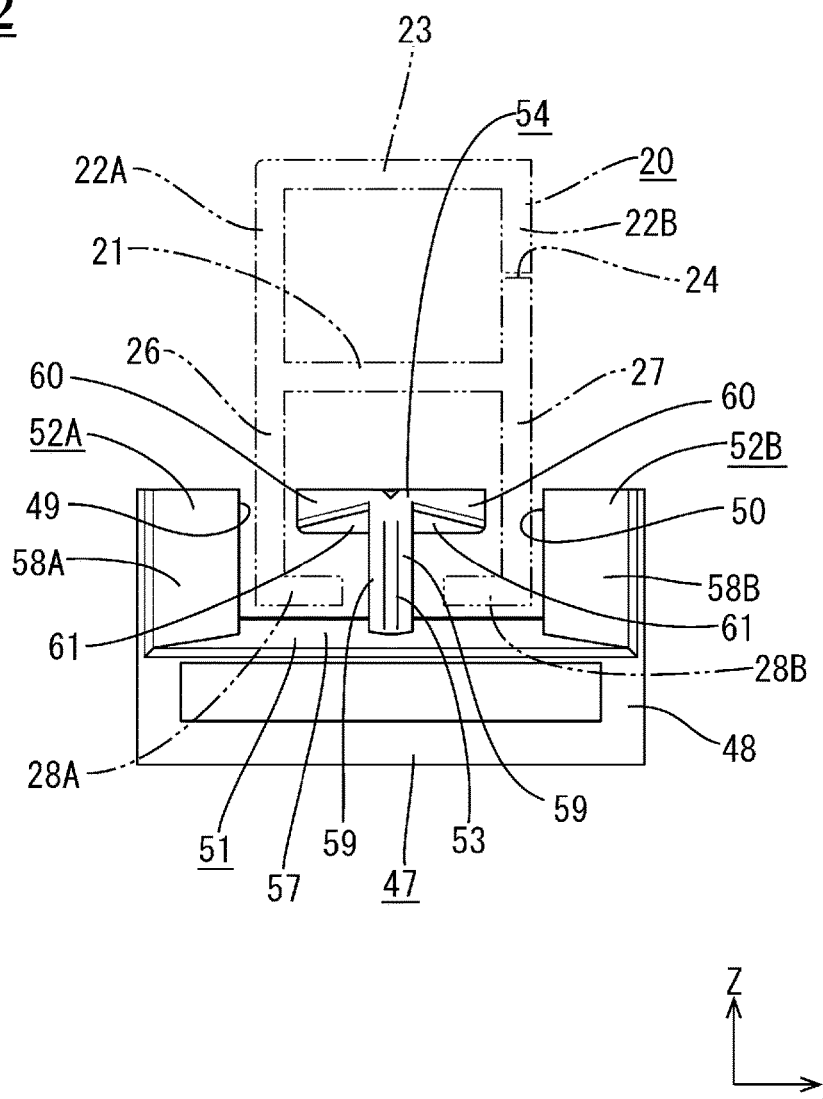
FIG. 12 is a front view illustrating the resin rail.

As shown in FIGS. 8 and 9, each resin rail 47 has, on its upper side, a left groove portion 49 (an example of an engaged portion) and a right groove portion 50 (an example of the engaged portion) that extend in the front-rear direction and are spaced apart. As shown in FIG. 12, the upper end portion of the pedestal 48 forms a bottom wall 51 for the left groove portion 49 and the right groove portion 50. At the left and right end portions of the bottom wall 51, a pair of side walls 52A and 52B rise up therefrom. A supporting wall 53 (an example of side walls of the groove portions) is formed rising up from the upper side of the bottom wall 51 in the vicinity of its center in the left-right direction. An upper wall 54 that extends in the front-rear direction and extends in both the left and right directions is formed at the upper end portion of the supporting wall 53. The supporting wall 53 corresponds to the side walls that constitute the grooves of the left groove portion 49 and the right groove portion 50.

Figure 11:
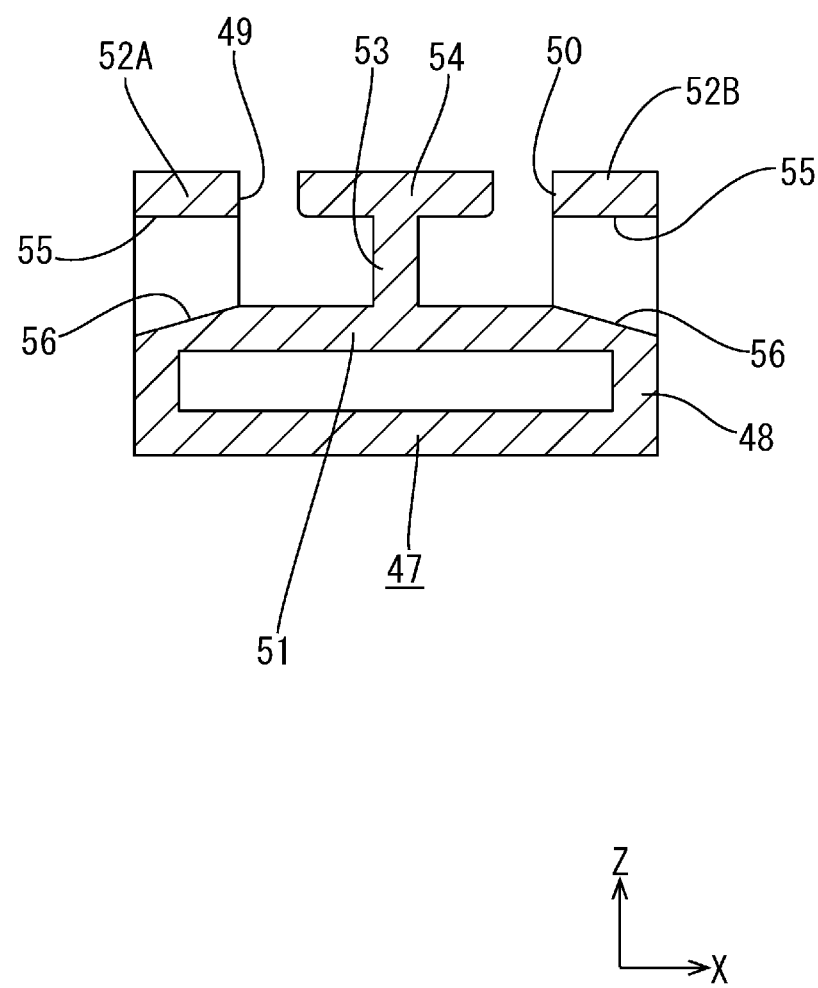
FIG. 11 is a cross-sectional view taken along a line XI-XI in FIG. 9.

As shown in FIG. 11, each of the side walls 52A and 52B has, at positions close to the bottom wall 51, a plurality of (four, in the present embodiment) through holes 55 at intervals in the front-rear direction, the plurality of through holes 55 penetrating the side walls 52A and 52B. The bottom surfaces 56 of the through holes 55 are inclined downward toward the outside of the side walls.

The left groove portion 49 and the right groove portion 50 are open to the front and rear. As shown in FIG. 9, the front end portion of the supporting wall 53 is arranged at a position slightly shifted rearward from the front end portion of the resin rail 47. Accordingly, the front end portion of the upper wall 54 as well is arranged at a position slightly shifted rearward from the front end portion of the resin rail 47. Furthermore, the rear end portion of the supporting wall 53 is arranged at a position slightly shifted frontward from the rear end portion of the resin rail 47. Accordingly, the rear end portion of the upper wall 54 as well is arranged at a position slightly shifted frontward from the front end portion of the resin rail 47.

As shown in FIG. 12, the left engaging portion 26 is inserted into the left groove portion 49 from its opening on the front or rear side, and the right engaging portion 27 is inserted into the right groove portion 50 from its opening on the front or rear side. Accordingly, the armoring member 20 is engaged with the resin rail 47 so that they are slidable with respect to each other. In other words, the armoring member 20 is configured to slide and move on the resin rail 47 along with movement of the slider 16. The armoring member 20 is retained so as not to be removed upward, as a result of the retaining portion 28A of the left engaging portion 26 and the retaining portion 28B of the right engaging portion 27 abutting against the upper wall 54 from below.

As shown in FIG. 3, the armoring member 20 is arranged at a position apart from the inner surface of the metal rail 15 in a state in which it is attached to the resin rail 47. Accordingly, the armoring member 20 is prevented from coming into sliding contact with the inner surface of the metal rail 15 even when the slider 16 slides and moves with respect to the metal rail 15.

As shown in FIG. 9, entry-facilitating structures for facilitating entry of the left engaging portion 26 and the right engaging portion 27 of the armoring member 20 into the left groove portion 49 and the right groove portion 50 respectively are formed in the openings on the front and rear end sides of the resin rail 47. In the entry-facilitating structures, the left groove portion 49 and the right groove portion 50 widen toward their end portions in the front-rear direction (longitudinal direction). The entry-facilitating structure of the front end side of the resin rail 47 and the entry-facilitating structure on the rear end side thereof are symmetrical with respect to the front-rear direction, and thus the same reference numeral as for the entry-facilitating structure on the front end side is given also to the entry-facilitating structure on the rear end side, and a corresponding description will be omitted.

Figure 10:
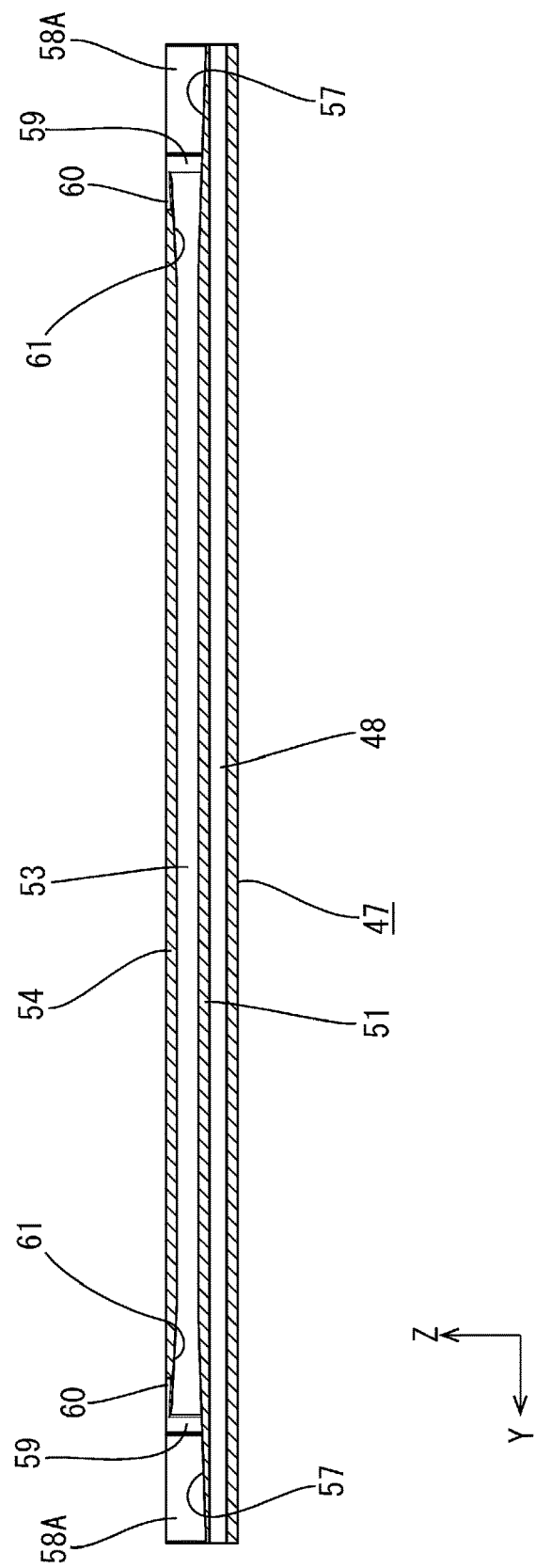
FIG. 10 is a longitudinal cross-sectional view of the resin rail.

As shown in FIG. 10, the region of the bottom wall 51 of the resin rail 47 that is close to the front end portion serves as a bottom wall-side entry facilitating portion 57 that has an inclined surface inclined downward toward the front side. As a result of the lower end edge of the left engaging portion 26 or the right engaging portion 27 coming into sliding contact with the inclined surface of the bottom wall-side entry facilitating portion 57, the left engaging portion 26 is guided into the left groove portion 49, and the right engaging portion 27 is guided into the right groove portion 50.

As shown in FIG. 9, the regions of the side walls 52A and 52B of the resin rail 47 that are located frontward of the supporting wall 53 serve as side wall-side entry facilitating portions 58A and 58B that have inclined surfaces so that the space is enlarged in the left-right direction toward the front side. The side wall-side entry facilitating portions 58A and 58B formed on the left and right side walls 52A and 52B are symmetric with respect to left and right. As a result of the left engaging portion 26 or the right engaging portion 27 coming into sliding contact with the inclined surface of the side wall-side entry facilitating portion 58A or 58B, the left engaging portion 26 is guided into the left groove portion 49, and the right engaging portion 27 is guided into the right groove portion 50.

As shown in FIG. 12, the front end portion of the supporting wall 53 is tapered, and serves as a supporting wall-side entry facilitating portion 59. Since the supporting wall-side entry facilitating portion 59 is tapered, entry of the left engaging portion 26 into the left groove portion 49, which is located on the left side of the supporting wall 53, is facilitated, and entry of the right engaging portion 27 into the right groove portion 50, which is located on the right side of the supporting wall, is facilitated.

As shown in FIGS. 10 and 12, the front end portion of the upper wall 54 is tapered, and serves as a first upper wall-side entry facilitating portion 60. Since the first upper wall-side entry facilitating portion 60 is tapered, the entry of the left engaging portion 26 into the left groove portion 49, which is located on the left side of the supporting wall 53, is facilitated, and the entry of the right engaging portion 27 into the right groove portion 50, which is located on the right side of the supporting wall 53, is facilitated.

Furthermore, the region of the lower side of the upper wall 54 that is close to the front end portion has an inclined surface inclined upward toward the front end portion, and serves as a second upper wall-side entry facilitating portion 61. As a result of the retaining portion 28A of the left engaging portion 26 or the retaining portion 28B of the right engaging portion 27 coming into sliding contact with the inclined surface of the second upper wall-side entry facilitating portion 61 from below, the left engaging portion 26 is guided into the left groove portion 49, and the right engaging portion 27 is guided into the right groove portion 50.

Functions and Effects of the Embodiment

Hereinafter, functions and effects of the present embodiment will be described. The slide wiring device 10 according to the present embodiment is provided with: the metal rail 15; the slider 16 slidably arranged on the metal rail 15; the wire harness 13 in which a plurality of electric wires 19 are armored by the armoring member 20 made of a resin, the wire harness 13 being coupled to the slider 16 and moving in the metal rail 15 along with movement of the slider 16; and the resin rail 47 that is arranged inside the metal rail 15, and is configured to confine the movement of the armoring member 20. The armoring member 20 moves on the resin rail 47 along with the movement of the slider 16.

According to the present embodiment, the armoring member 20 moves on the resin rail 47, and thus does not need to come into sliding contact with (be confined by) the metal rail 15. Accordingly, even if the metal rail 15 is used, it is possible to confine the movement of the wire harness 13 while suppressing damage of the armoring member 20.

Furthermore, according to the present embodiment, the armoring member 20 has the left engaging portion 26 and the right engaging portion 27 that protrude to the resin rail 47 side, the resin rail 47 includes the left groove portion 49 that engages with the left engaging portion 26, and the right groove portion 50 that engages with the right engaging portion 27. The left groove portion 49 with which the left engaging portion 26 engages includes, at its end portion, the entry-facilitating structure in which the space is enlarged toward the end edge portion, in the longitudinal direction, of the left groove portion 49, and that facilitates entry of the left engaging portion 26 into the left groove portion 49. Furthermore, the right groove portion 50 with which the right engaging portion 27 engages includes, at its end portion, the entry-facilitating structure in which the space is enlarged toward the end edge portion, in the longitudinal direction, of the right groove portion 50, and that facilitates entry of the right engaging portion 27 into the right groove portion 50.

Figure 13:
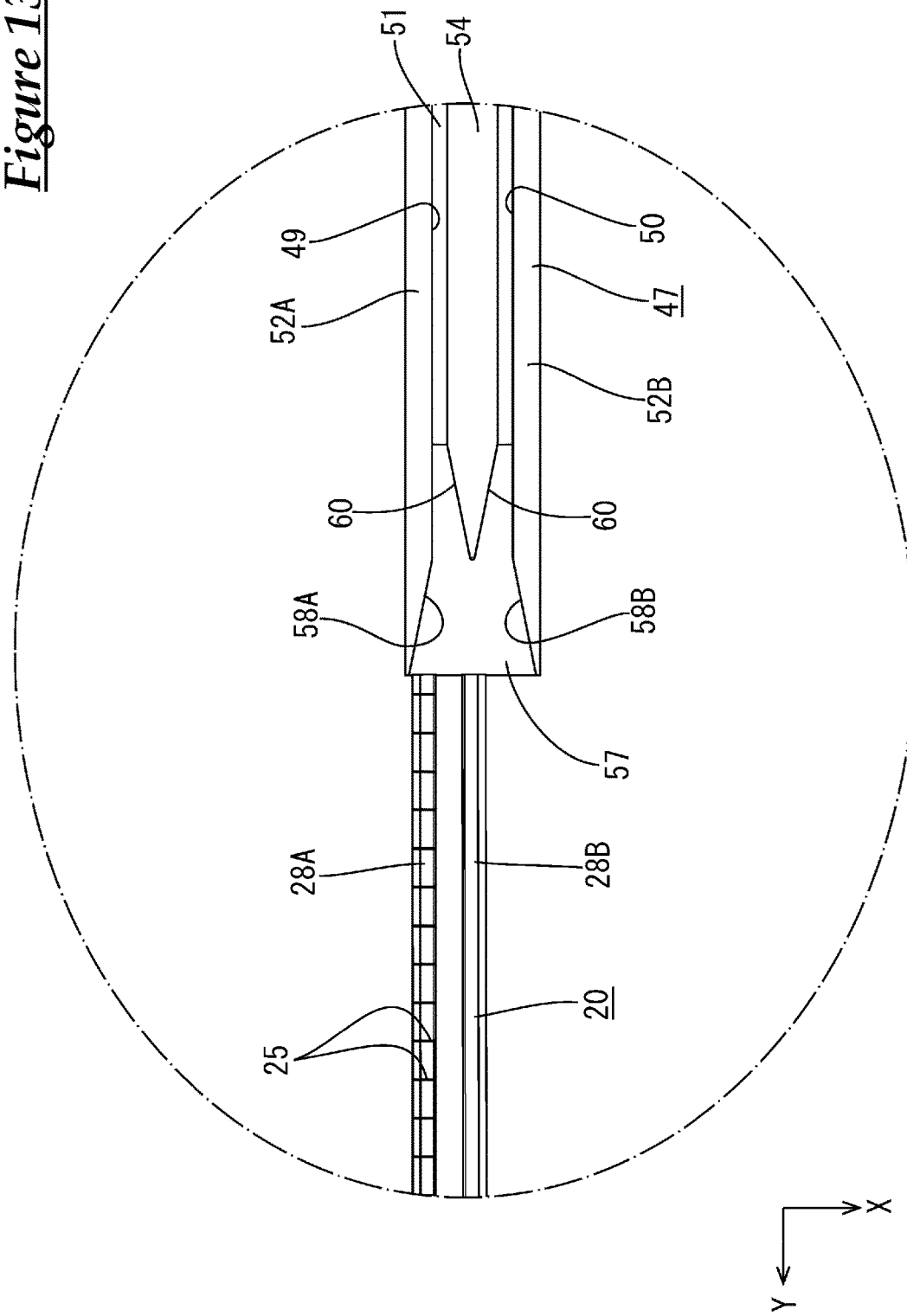
FIG. 13 is a partially enlarged plan view illustrating a step of assembling the armoring member and the resin rail.

The functions and effects of the entry-facilitating structures will be described with reference to FIGS. 13 to 17. As shown in FIG. 13, a structure in which the armoring member 20 is assembled to the resin rail 47 from a position shifted to the left side of the resin rail 47 is taken as an example. Note that the procedure for assembling the armoring member 20 and the resin rail 47 is not limited to the following description.

Figure 14:
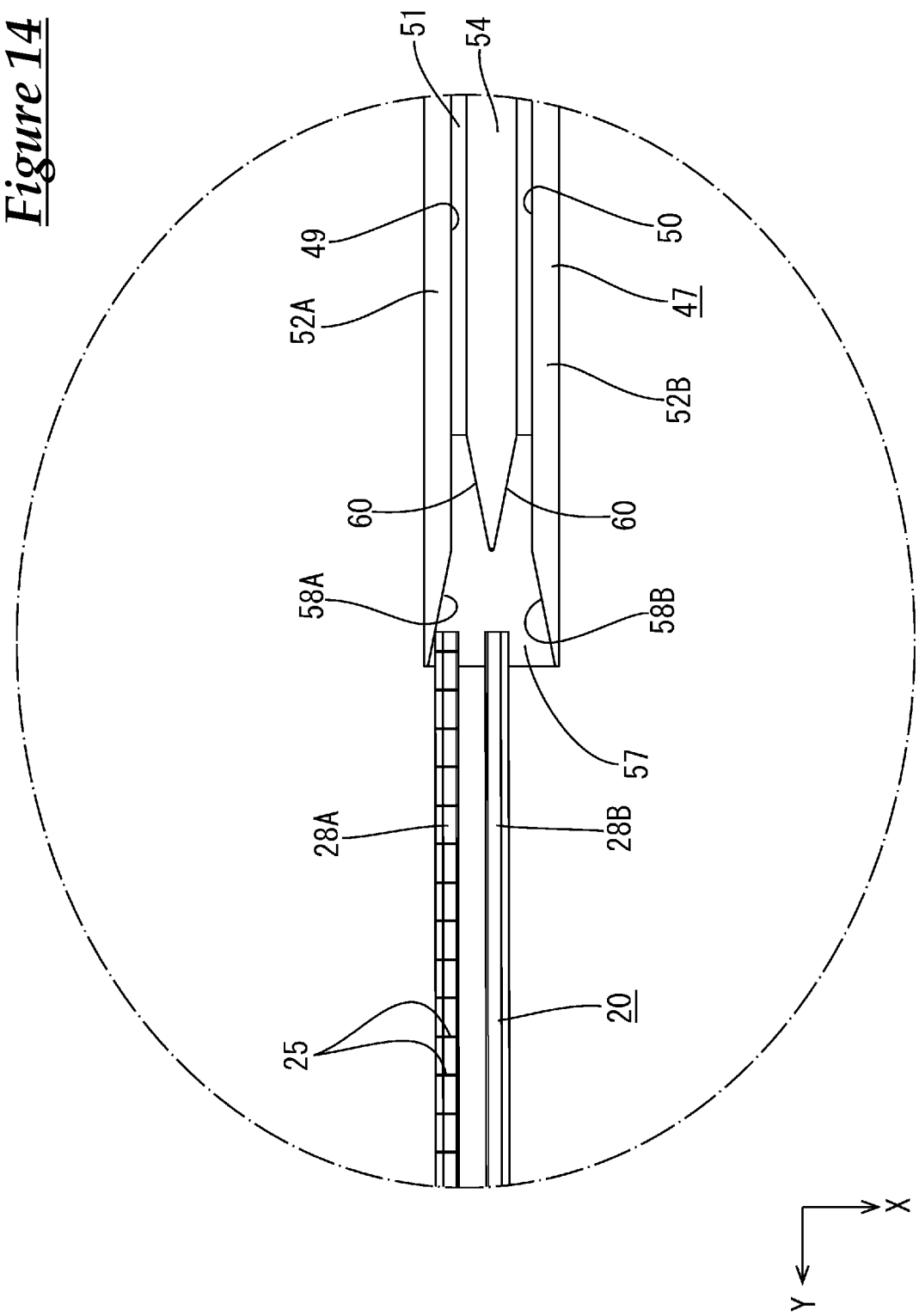
FIG. 14 is a partially enlarged plan view illustrating a step of assembling the armoring member and the resin rail.

The armoring member 20 is moved forward from the position shown in FIG. 13. Then, as shown in FIG. 14, the front end portion of the left engaging portion 26 of the armoring member 20 abuts against the side wall-side entry facilitating portion 58A of the side wall 52A of the resin rail 47 from the front. Accordingly, the front end edge of the left engaging portion 26 is brought into sliding contact with the inclined surface of the side wall-side entry facilitating portion 58A, and thus the armoring member 20 is guided diagonally forward to the right.

Figure 15:
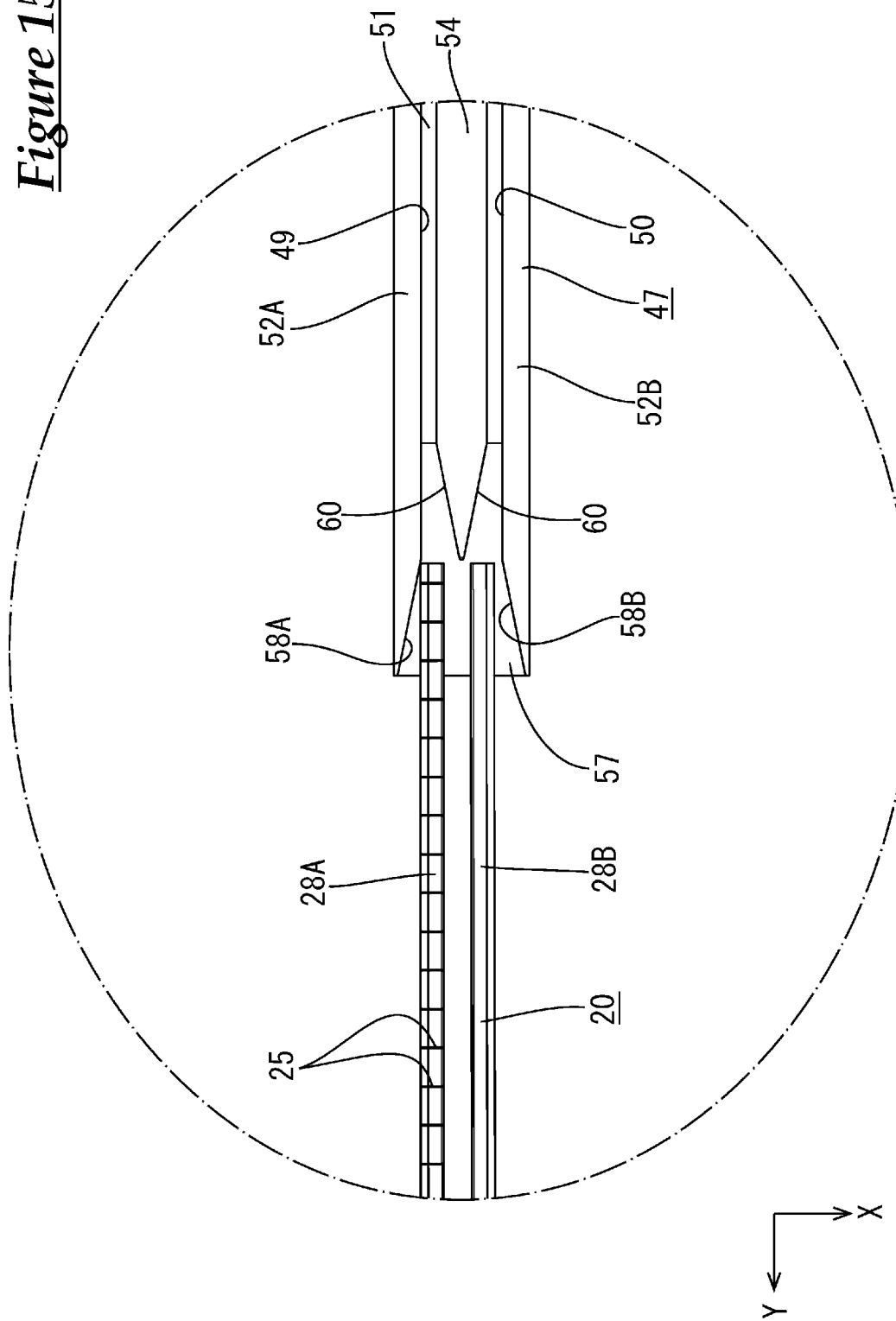
FIG. 15 is a partially enlarged plan view illustrating a step of assembling the armoring member and the resin rail.

Furthermore, when, as shown in FIG. 15, the front end edge of the left engaging portion 26 has reached the rear end edge of the side wall-side entry facilitating portion 58A, the left engaging portion 26 is inserted into the left groove portion 49. In this state, the front end edge of the right engaging portion 27 is configured to be located at the front end portion of the right groove portion 50, and in front of the supporting wall-side entry facilitating portion 59 of the supporting wall 53.

Figure 16:
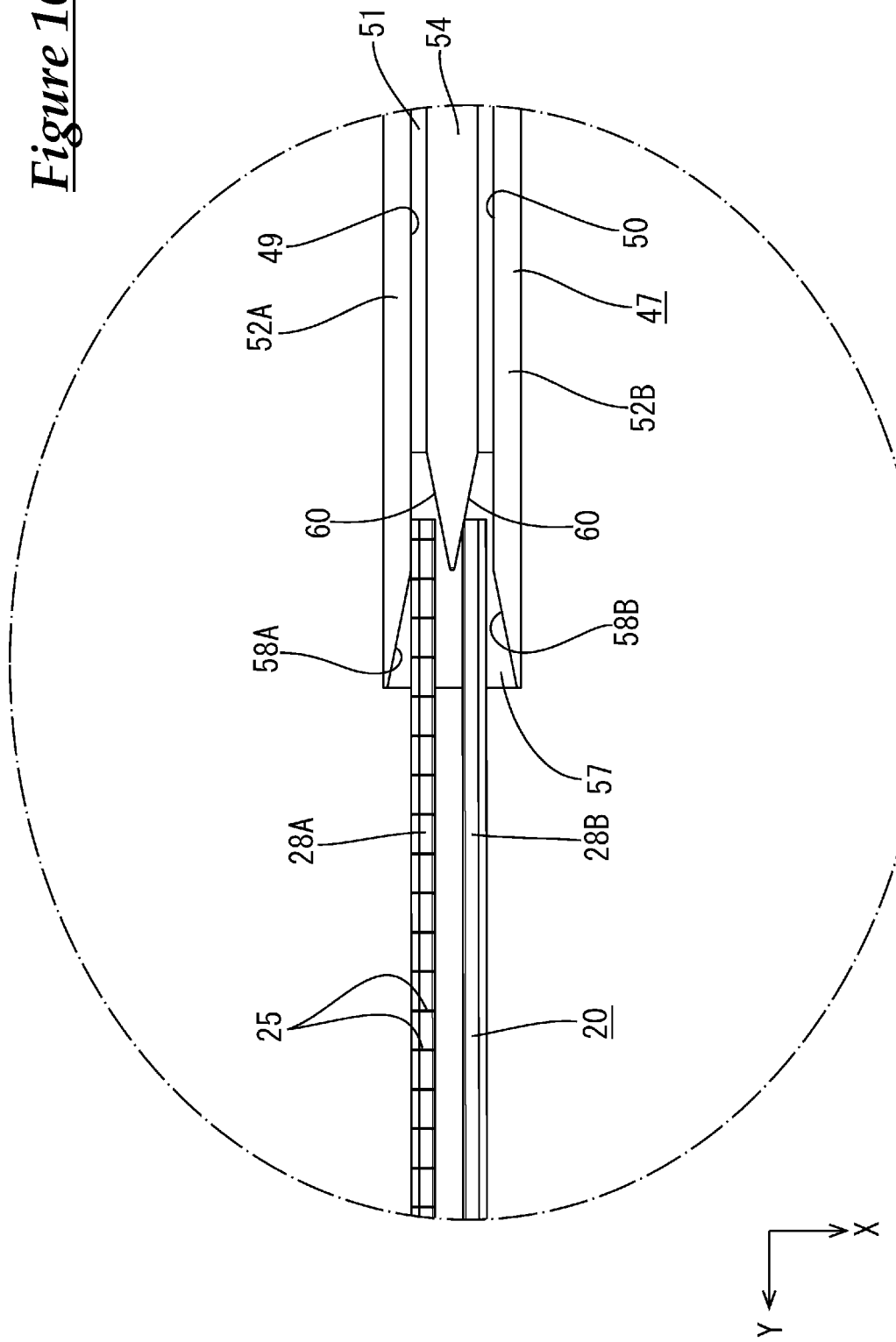
FIG. 16 is a partially enlarged plan view illustrating a step of assembling the armoring member and the resin rail.

Furthermore, as shown in FIG. 16, the front end edge of the retaining portion 28B formed on the right engaging portion 27 abuts against the inclined surface of the supporting wall-side entry facilitating portion 59 of the supporting wall 53 from the front. Accordingly, the front end edge of the retaining portion 28B is brought into sliding contact with the inclined surface of the supporting wall-side entry facilitating portion 59, and thus the armoring member 20 is further guided diagonally forward to the right. Accordingly, the right engaging portion 27 is reliably guided into the right groove portion 50.

Figure 17:
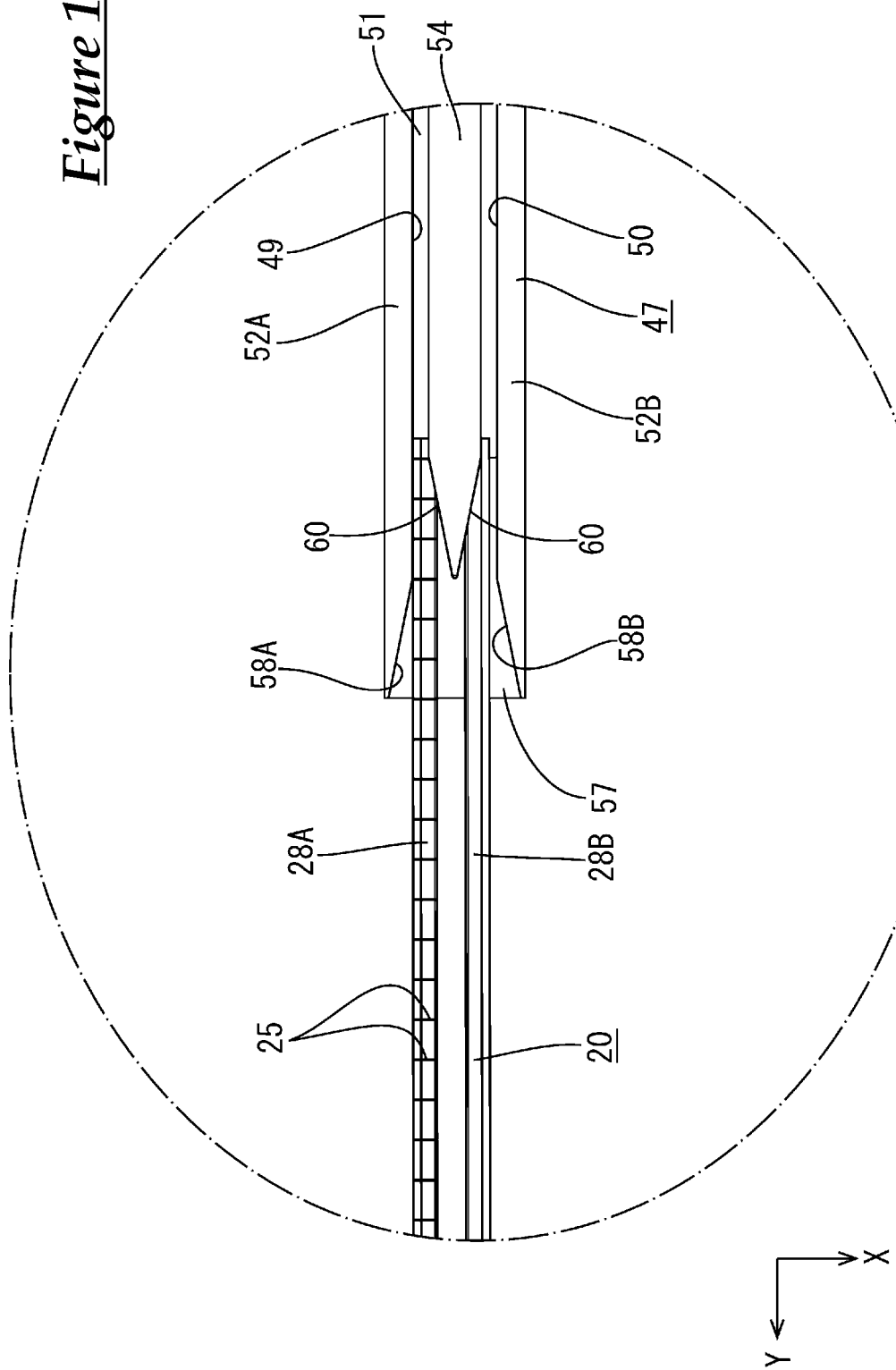
FIG. 17 is a partially enlarged plan view illustrating a state in which the armoring member is assembled to the resin rail.

When the armoring member 20 is further moved forward, as shown in FIG. 17, the left engaging portion 26 of the armoring member 20 is held so as to be slidable in the front-rear direction into the left groove portion 49 of the resin rail 47, and the right engaging portion 27 of the armoring member 20 is held so as to be slidable in the front-rear direction into the right groove portion 50 of the resin rail 47.

As described above, the left engaging portion 26 and the right engaging portion 27 are respectively configured to be reliably facilitated to enter the left groove portion 49 and the right groove portion 50 by the side wall-side entry facilitating portion 58A and the supporting wall-side entry facilitating portion 59. Accordingly, when the engaging portions 26 and 27 are inserted into the grooves 49 and 50, the collision of the armoring member 20 with the resin rail 47 is suppressed, thus making it possible to further suppress the damage of the armoring member 20.

According to the present embodiment, the left groove portion 49 and the right groove portion 50 each include the bottom wall 51, and the side walls 52A and 52B that rise up from the side edges of the bottom wall 51, and each of the side walls 52A and 52B have through holes 55 penetrating the side walls 52A and 52B at positions close to the bottom wall 51, and each through hole 55 has the bottom surface 56 inclined downward toward the outside of the side walls 52A and 52B. Accordingly, even if a foreign object such as sand or gravel stone has entered the left groove portion 49 or the right groove portion 50, the object is promptly discharged from the through hole 55 to the outside of the left groove portion 49 or the right groove portion 50. It is possible to keep the armoring member 20 from colliding with and being damaged by any foreign object that has entered the left groove portion 49 or the right groove portion 50.

Furthermore, according to the present embodiment, the metal rail 15 has, on its inner bottom surface 43, the bolt 14 for fixing the metal rail 15 to the vehicle body 11, and the resin rail 47 includes the pedestal 48 that is arranged on the inner bottom surface 43 of the higher metal rail 15, and has a height greater than the height of the bolt 14, the resin rail 47 confining the movement of the armoring member 20 above the pedestal 48. Accordingly, it is possible to keep the armoring member 20 from interfering with the bolt 14, and thus it is possible to reliably suppress the damage of the armoring member 20.

Other Embodiments

The present invention is not limited to the above-described embodiment explained in the description and illustrated in the drawings, and the technical scope of the present invention encompasses, for example, the following embodiments.

The present embodiment has a configuration in which the armoring member 20 is provided with the left engaging portion 26 and the right engaging portion 27, but the present invention is not limited to this, and the armoring member 20 may be provided with one engaging portion, or three or more engaging portions. Furthermore, the present embodiment has a configuration in which the resin rail 47 is provided with the left groove portion 49 and the right groove portion 50, but the present invention is not limited to this, and the resin rail 47 may also be provided with one groove portion, or three or more groove portions.

The slider 16 may also be attached to any member such as a slide door that slides with respect to the metal rail 15.

The wire harness 13 is configured to include four electric wires 19, but the present invention is not limited to this, and the wire harness 13 may also include one to three, or five or more electric wires 19.

The present embodiment has a configuration in which a slide wiring device 10 is arranged on a single metal rail 15, but the present invention is not limited to this, and a slide wiring device 10 may also be arranged on a pair of metal rails 15. Furthermore, a configuration is also possible in which one metal rail 15 is provided, and a slide wiring device 10 is arranged on this metal rail 15. Furthermore, a configuration is also possible in which at least three metal rails 15 are provided, and slide wiring devices 10 are arranged on all of the metal rails 15, or slide wiring devices 10 are arranged on only some of the plurality of metal rails 15.

The present embodiment has a configuration in which the resin rail 47 includes the pedestal 48, but the present invention is not limited to this, and pedestal 48 may also be omitted.

The present embodiment has a configuration in which the resin rail 47 has the entry-facilitating structures, but the present invention is not limited to this, and the entry-facilitating structures may be omitted.

The present embodiment has a configuration in which the resin rail 47 has the through holes 55, but the present invention is not limited to this, and the resin rail 47 may also have no through hole 55.

In the present embodiment, the bolt 14 is used as a fixing member for the metal rail 15, but the present invention is not limited to this, and the fixing member may also be a nut or rivet, that is, any means may be selected as appropriate.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE NUMERALS

10: Slide wiring device
13: Wire harness
14: Bolt
15: Metal rail
16: Slider
19: Electric wire
20: Armoring member
26: Left engaging portion
27: Right engaging portion
47: Resin rail
48: Pedestal
49: Left groove portion
50: Right groove portion
51: Bottom wall
52A, 52B: Side wall
55: Through hole
57: Bottom wall-side entry facilitating portion
58A, 58B: Side wall-side entry facilitating portion
59: Supporting wall-side entry facilitating portion
60: First upper wall-side entry facilitating portion
61: Second upper wall-side entry facilitating portion

The invention claimed is:

1. A slide wiring device comprising:
a metal rail;
a slider slidably arranged on the metal rail;
a wire harness in which a plurality of electric wires are armored by an armoring member made of a resin, the wire harness being coupled to the slider and configured to move in the metal rail along with movement of the slider; and
a resin rail that is arranged inside the metal rail, and is configured to confine movement of the armoring member,
wherein the armoring member is configured to move on the resin rail along with the movement of the slider.

2. The slide wiring device according to claim 1,
wherein the armoring member includes an engaging portion that protrudes to the resin rail side,
the resin rail includes an engaged portion that engages with the engaging portion,
the engaged portion is a groove portion into which the engaging portion is inserted, and
the groove portion includes, at its end portion, an entry-facilitating portion that widens toward the end portion, in a longitudinal direction, of the groove portion, and that is configured to facilitate entry of the engaging portion into the groove portion.

3. The slide wiring device according to claim 2,
wherein the groove portion has a bottom wall, and side walls that rise up from side edges of the bottom wall,
each side wall has a through hole penetrating the side wall at a position close to the bottom wall, and
the through hole has a bottom surface inclined downward toward the outside of the side wall.

4. The slide wiring device according to claim 1,
wherein the metal rail has, on its inner bottom surface, a fixing member for fixing the metal rail to a vehicle body, and
the resin rail includes a pedestal that is arranged on the inner bottom surface and has a height greater than the height of the fixing member, the resin rail confining the movement of the armoring member above the pedestal.

* * * * *